United States Patent
Jovovic et al.

(10) Patent No.: US 10,975,821 B2
(45) Date of Patent: Apr. 13, 2021

(54) INJECTION DEVICE FOR METERING A FLUID AND MOTOR VEHICLE HAVING SUCH AN INJECTION DEVICE

(71) Applicant: CONTINENTAL AUTOMOTIVE GMBH, Hannover (DE)

(72) Inventors: Dejan Jovovic, Regensburg (DE); Anatoliy Lyubar, Wolfsegg (DE)

(73) Assignee: Vitesco Technologies GmbH, Hannover (DE)

(*) Notice: Subject to any disclaimer, the term of this patent is extended or adjusted under 35 U.S.C. 154(b) by 10 days.

(21) Appl. No.: 15/922,548

(22) Filed: Mar. 15, 2018

(65) Prior Publication Data
US 2018/0202404 A1 Jul. 19, 2018

Related U.S. Application Data

(63) Continuation of application No. PCT/EP2016/069022, filed on Aug. 10, 2016.

(30) Foreign Application Priority Data

Sep. 15, 2015 (DE) .................... 10 2015 217 673.8

(51) Int. Cl.
*F02M 61/16* (2006.01)
*F01N 3/20* (2006.01)
(Continued)

(52) U.S. Cl.
CPC ......... *F02M 61/167* (2013.01); *F01N 3/2066* (2013.01); *F02M 21/0251* (2013.01);
(Continued)

(58) Field of Classification Search
CPC ......... F01N 2610/02; F01N 2610/1453; F01N 2610/146; F01N 2610/1486; F01N 3/2066;
(Continued)

(56) References Cited

U.S. PATENT DOCUMENTS

| 4,957,085 A | 9/1990 | Sverdlin |
| 5,275,341 A | 1/1994 | Romann et al. |

(Continued)

FOREIGN PATENT DOCUMENTS

| DE | 10058015 A1 | 5/2002 |
| DE | 102007026892 A1 | 12/2008 |

(Continued)

OTHER PUBLICATIONS

English Translation of DE-102010039052-A1 of Heiter Tobias (Year: 2010).*

(Continued)

*Primary Examiner* — Anthony Ayala Delgado

(57) ABSTRACT

An injection device for metering a fluid, having the following: a valve, which has a valve needle and a valve seat; a nozzle shaft, which surrounds the valve needle and which holds a volume of the fluid; and an inlet chamber, which adjoins the nozzle shaft on the side of the nozzle shaft facing away from the valve and which has a flow connection to the nozzle shaft. The injection device has at least one compressible volume compensation element, which is filled with a gas and which, within the injection device, is in contact with the fluid.

7 Claims, 3 Drawing Sheets

(51) Int. Cl.
*F02M 21/02* (2006.01)
*F02M 51/06* (2006.01)

(52) U.S. Cl.
CPC .... *F02M 21/0263* (2013.01); *F02M 51/0682* (2013.01); *F01N 2610/02* (2013.01); *F01N 2610/146* (2013.01); *F01N 2610/1453* (2013.01); *F01N 2610/1486* (2013.01); *Y02A 50/20* (2018.01); *Y02T 10/12* (2013.01); *Y02T 10/30* (2013.01)

(58) Field of Classification Search
CPC ........... F02M 21/0251; F02M 21/0263; F02M 51/0682; F02M 61/167; Y02A 50/2325; Y02T 10/24; Y02T 10/32
See application file for complete search history.

(56) References Cited

U.S. PATENT DOCUMENTS

| | | | |
|---|---|---|---|
| 5,383,606 A | 1/1995 | Stegmaier et al. | |
| 5,516,424 A | 5/1996 | Strohschein | |
| 5,634,597 A | 6/1997 | Krohn et al. | |
| 5,794,856 A | 8/1998 | Nally | |
| 6,173,915 B1 | 1/2001 | Cohen et al. | |
| 6,199,775 B1 | 3/2001 | Dallmeyer | |
| 6,264,112 B1 | 7/2001 | Landschoot et al. | |
| 6,325,049 B1 | 12/2001 | Nally | |
| 6,676,044 B2 | 1/2004 | Dallmeyer et al. | |
| 6,685,112 B1 | 2/2004 | Hornby et al. | |
| 6,698,664 B2 | 3/2004 | Dallmeyer et al. | |
| 6,834,667 B2 | 12/2004 | Sumiya et al. | |
| 7,128,281 B2 | 10/2006 | Cho et al. | |
| 7,296,781 B2 | 11/2007 | Akabane | |
| 7,309,033 B2 | 12/2007 | Dallmeyer | |
| 7,389,952 B2 | 6/2008 | Dallmeyer | |
| 7,422,160 B2 | 9/2008 | Dallmeyer | |
| 7,429,006 B2 | 9/2008 | Dallmeyer | |
| 7,431,226 B2 | 10/2008 | Cho et al. | |
| 7,481,049 B2 | 1/2009 | Huber et al. | |
| 7,506,826 B2 | 3/2009 | Miller | |
| 7,552,880 B2 | 6/2009 | Dallmeyer | |
| 7,617,605 B2 | 11/2009 | Fochtman et al. | |
| 7,617,991 B2 | 11/2009 | Wells et al. | |
| 7,673,818 B2 | 3/2010 | Akabane | |
| 7,721,713 B2 | 5/2010 | Hayatani et al. | |
| 7,798,131 B2 | 9/2010 | Hornby | |
| 7,832,660 B2 | 11/2010 | Imoehl | |
| 7,866,577 B2 | 1/2011 | Yoshimaru et al. | |
| 7,886,718 B2 | 2/2011 | Manubolu et al. | |
| 7,931,217 B2 | 4/2011 | Matsusaka et al. | |
| 7,942,348 B2 | 5/2011 | Reiter | |
| 7,942,381 B2 | 5/2011 | Sugiyama et al. | |
| 8,002,287 B2 | 8/2011 | Wagner | |
| 8,037,868 B2 | 10/2011 | Kannan et al. | |
| 8,087,239 B2 | 1/2012 | Bugos et al. | |
| 8,215,573 B2 | 7/2012 | Hornby | |
| 8,347,605 B2 | 1/2013 | Bugos et al. | |
| 8,646,704 B2 | 2/2014 | Yamamoto et al. | |
| 8,740,113 B2 | 6/2014 | Roessle et al. | |
| 8,857,743 B2 | 10/2014 | Shingu et al. | |
| 8,973,895 B2 | 3/2015 | Thomas et al. | |
| 8,997,463 B2 | 4/2015 | Bugos et al. | |
| 8,998,114 B2 | 4/2015 | Olivier et al. | |
| 9,200,604 B2 | 12/2015 | Derenthal et al. | |
| 9,273,581 B2 | 3/2016 | Van Vuuren | |
| 9,334,780 B2 * | 5/2016 | Hodgson | F01N 3/2066 |
| 9,422,901 B2 | 8/2016 | Suzuki et al. | |
| 9,587,603 B2 | 3/2017 | Hanjagi et al. | |
| 9,605,638 B2 | 3/2017 | Falaschi et al. | |
| 9,683,472 B2 | 6/2017 | Thomas et al. | |
| 9,777,859 B2 | 10/2017 | van Vuuren et al. | |
| 9,822,749 B2 | 11/2017 | Derenthal et al. | |
| 2002/0104904 A1 | 8/2002 | McFarland | |
| 2003/0094513 A1 | 5/2003 | Luft | |
| 2004/0262333 A1 | 12/2004 | Huber et al. | |
| 2005/0023383 A1 | 2/2005 | Morton | |
| 2005/0133639 A1 | 6/2005 | Hornby | |
| 2005/0173869 A1 | 8/2005 | Wagner | |
| 2005/0269426 A1 | 12/2005 | Cho | |
| 2006/0254648 A1 | 11/2006 | Maisch et al. | |
| 2007/0033927 A1 | 2/2007 | Hornby et al. | |
| 2007/0057095 A1 | 3/2007 | Bayer et al. | |
| 2007/0095745 A1 | 5/2007 | Sebastian | |
| 2007/0114299 A1 | 5/2007 | Scheffel | |
| 2007/0194152 A1 | 8/2007 | Abe et al. | |
| 2009/0065608 A1 | 3/2009 | Vogel et al. | |
| 2009/0179090 A1 | 7/2009 | Reiter | |
| 2009/0184184 A1 | 7/2009 | Schwegler et al. | |
| 2009/0229575 A1 | 9/2009 | Giorgetti et al. | |
| 2009/0230677 A1 | 9/2009 | Mannucci et al. | |
| 2010/0025500 A1 * | 2/2010 | Pollard | C23C 8/02 239/584 |
| 2010/0213286 A1 | 8/2010 | Grandi et al. | |
| 2010/0264229 A1 | 10/2010 | Facchin | |
| 2010/0313553 A1 | 12/2010 | Cavanagh et al. | |
| 2011/0192140 A1 | 8/2011 | Olivier et al. | |
| 2011/0258983 A1 | 10/2011 | Vosz | |
| 2011/0309166 A1 | 12/2011 | Thomas et al. | |
| 2012/0031996 A1 | 2/2012 | Harvey et al. | |
| 2013/0026257 A1 | 1/2013 | Jalal et al. | |
| 2013/0061578 A1 | 3/2013 | Van Vuuren | |
| 2014/0001290 A1 | 1/2014 | Nishida et al. | |
| 2014/0008468 A1 | 1/2014 | Graner et al. | |
| 2014/0054394 A1 | 2/2014 | Bugos et al. | |
| 2014/0075923 A1 * | 3/2014 | Hodgson | F01N 3/2066 60/282 |
| 2014/0138568 A1 | 5/2014 | van Vuuren et al. | |
| 2015/0059322 A1 | 3/2015 | Bugos et al. | |
| 2015/0102241 A1 | 4/2015 | Sebastian | |
| 2015/0115051 A1 | 4/2015 | Van Vuuren | |
| 2015/0369176 A1 | 12/2015 | Ittlinger et al. | |
| 2017/0101966 A1 | 4/2017 | Filippi et al. | |
| 2018/0023438 A1 | 1/2018 | McFarland | |
| 2018/0058291 A1 | 3/2018 | Bugos et al. | |
| 2018/0179938 A1 | 6/2018 | Shaull et al. | |
| 2018/0202404 A1 | 7/2018 | Jovovic et al. | |
| 2019/0078482 A1 | 3/2019 | Cosby et al. | |
| 2019/0078485 A1 | 3/2019 | VanVuuren et al. | |
| 2019/0078486 A1 | 3/2019 | Hatfield et al. | |
| 2019/0078487 A1 | 3/2019 | Hatfield et al. | |
| 2019/0078488 A1 | 3/2019 | Hatfield et al. | |
| 2019/0234274 A1 | 8/2019 | Hatfield et al. | |

FOREIGN PATENT DOCUMENTS

| | | | | |
|---|---|---|---|---|
| DE | 102008041544 A1 | 3/2010 | | |
| DE | 102008042987 A1 | 4/2010 | | |
| DE | 102009000107 A1 | 7/2010 | | |
| DE | 102010029254 A1 | 12/2011 | | |
| DE | 102010039052 A1 * | 2/2012 | ........... | F01N 3/2066 |
| DE | 102010039052 A1 | 2/2012 | | |
| DE | 102010045509 A1 | 3/2012 | | |
| DE | 102011018181 A1 | 2/2014 | | |
| DE | 102012021664 A1 | 5/2014 | | |
| DE | 102015217673 A1 | 3/2017 | | |
| EP | 1965049 A2 | 9/2008 | | |
| JP | 2002327660 A | 11/2002 | | |
| JP | 2004316520 A | 11/2004 | | |
| JP | 4200003 B2 | 11/2008 | | |
| JP | 2009504985 A | 2/2009 | | |
| JP | 2010216483 A | 9/2010 | | |
| KR | 307891 A | 4/1994 | | |
| KR | 20130140871 A | 12/2013 | | |
| KR | 102014092848 A | 7/2014 | | |

OTHER PUBLICATIONS

"Marvac 125—Chemical Composition," Vacuumschmelze GmbH & Co., http://www.vacuumschmelze.de/de/produkte/halbzeug-teile/physikalisch/federlegierungen/marvac-125/marvac-125-chemische-zusammensetzung.html (English language web page is http://www.

(56) References Cited

OTHER PUBLICATIONS vacuumschmelze.com/en/products/materials-parts/physical/spring-alloys/marvac-125/marvac-125-chemical-composition.html); May 15, 2013 (as reported by Vacuumschmlze GmbH and listed on web page; content captured on Mar. 14, 2018).

International Search Report and Written Opinion dated Oct. 10, 2016 from corresponding International Patent Application No. PCT/EP2016/069022.

German Office Action dated Jun. 8, 2016 for corresponding German Patent Application No. 10 2015 217 673.8.

"Marvac 125—Physical Properties," Vacuumschmelze GmbH & Co., http://www.vacuumschmelze.de/de/produkte/halbzeug-teile/physikalisch/federlegierungen/marvac-125/marvac-125-physikalische-eigenschaften.html (English language web page is http://www.vacuumschmelze.com/en/products/materials-parts/physical/spring-alloys/marvac-125/marvac-125-physical-properties.html); May 15, 2013 (as reported by Vacuumschmlze GmbH and listed on web page; content captured Mar. 14, 2018).

"Marvac 125—Mechanical Properties Tape," Vacuumschmelze GmbH & Co., http://www.vacuumschmelze.de/de/produkte/halbzeug-teile/physikalisch/federlegierungen/marvac-125/marvac-125-mechanische-eigenschaften-band.html (English language web page is http://www.vacuumschmelze.com/en/products/materials-parts/physical/spring-alloys/marvac-125/marvac-125-mechanische-eigenschaften-band.html); May 15, 2013 (as reported by Vacuumschmlze GmbH and listed on web page; content captured Mar. 14, 2018).

File History of U.S. Appl. No. 15/704,402, including non-final Office Action dated Nov. 25, 2019.

File History of U.S. Appl. No. 15/704,268, now U.S. Pat. No. 10,539,057, including non-final Office Action dated May 1, 2019.

File History of U.S. Appl. No. 15/704,294, now U.S. Pat. No. 10,502,112, including non-final Office Action dated Apr. 4, 2019.

File History of U.S. Appl. No. 16/261,115.

Korean Office Action dated May 17, 2019 for corresponding Korean Application No. 10-2018-7007417.

Chinese Office Action dated Jul. 3, 2019 for corresponding China Application 201680053595.4.

\* cited by examiner

INJECTION DEVICE FOR METERING A FLUID AND MOTOR VEHICLE HAVING SUCH AN INJECTION DEVICE

CROSS-REFERENCE TO RELATED APPLICATIONS

This application claims the benefit of PCT Application PCT/EP2016/069022, filed Aug. 10, 2016, which claims priority to German Patent Application 10 2015 217 673.8, filed Sep. 15, 2015. The disclosures of the above applications are incorporated herein by reference.

FIELD OF THE INVENTION

The present disclosure relates to an injection device for metering a fluid. In particular, it relates to an injection device for metering a urea solution in an exhaust gas aftertreatment system of a motor vehicle. It furthermore relates to a motor vehicle having such an injection device.

BACKGROUND OF THE INVENTION

An injection device for metering a liquid or gaseous medium, in particular a urea solution, is known from DE 2008 041 544 A1, for example. With such injection devices, there is the problem that the fluid may freeze and destroy the injection device by the associated expansion in its volume. For example, urea solution freezes at a temperature of −7° C.

Hitherto, the procedure has been, for example, to spray all the liquid out of the injection device when switching off the engine in an attempt to largely remove the urea solution from the injection device so as to prevent damage to the injection device due to an expansion in volume when the solution freezes. However, it is not possible to spray all the liquid out of the injection device in all cases and this is also not necessarily desired.

SUMMARY OF THE INVENTION

It is an object of the present invention to specify an injection device for metering a fluid with which the risk of destruction by freezing fluid is reduced.

This object is achieved by the subject matter of patent claim 1. Advantageous configurations are the subject matter of the dependent claims.

According to a first aspect of the invention, an injection device for metering a fluid is specified. According to another aspect, a motor vehicle having the injection device described is specified.

The injection device has a valve, which has a valve needle and a valve seat, and a nozzle shaft, which surrounds the valve needle and which holds a volume of the fluid. The injection device furthermore has an inlet chamber, which adjoins the nozzle shaft on the side of the nozzle shaft facing away from the valve and which has a flow connection to the nozzle shaft. The injection device has at least one compressible volume compensation element, which is filled with a gas and which, within the injection device, is in contact with the fluid. The valve shaft is preferably formed by a valve body of the injection device and/or by the at least one volume compensation element. In one embodiment, the injection device is a fluid injection valve.

Here and below, a volume compensation element in contact with the fluid is understood to mean a volume compensation element on which forces can be exerted by the fluid. In particular, the volume compensation element is designed and arranged in such a way that forces are exerted on the volume compensation element owing to the increase in volume if the fluid freezes. Since the volume compensation element is compressible, it can compensate for an expansion in the volume of the fluid. In particular, compensation is accomplished by compression of the gas with which the volume compensation element is filled. In particular, the volume compensation element is designed in such a way that the volume thereof decreases by a value which corresponds to 3.5% or more, preferably by 5% or more, in particular between 5% and 9%, inclusive, of the volume of the valve shaft when a urea solution filling the valve shaft freezes. Here, the volume of the valve shaft is understood to mean the fluid volume which the valve shaft holds during the operation of the injection device for injecting the fluid.

As a result, the risk of damage to the injection device is particularly low. In particular, the volume compensation element is in this way designed to compensate for the increase in volume of the urea solution when said solution freezes. This is about 7%, for example.

According to one embodiment, at least one volume compensation element has a wall region composed of a martensitically hardened steel. In this case, the wall region can completely or partially surround the gas filling. The use of a martensitically hardened steel for the volume compensation element has the advantage that, in the case of this material, the transition between elastic and plastic behavior occurs at very high forces, and therefore the material has a high strength at the same time as high toughness.

Martensitically hardened steels are also referred to as "maraging steels" (a portmanteau word formed from "martensite" and "aging"). They generally have a very low carbon content and are alloyed with a high proportion of nickel and can contain other alloying elements such as cobalt, molybdenum, aluminum, copper, niobium and/or titanium, which promote the formation of the martensite phase in the iron, given suitable heat treatment. Admittedly, conventional maraging steels have a relatively high nickel content, typically greater than 8% by weight and, in some cases, more than 12% by weight. However, there are also new high performance steels which are likewise included among maraging steels and have a nickel content of just 2-3% by weight and a manganese content of 9-12% by weight. Such maraging steels are also suitable for the wall region of the volume compensation element.

In this embodiment of the volume compensation element, it is possible, in particular, to envisage that a strip or sheet composed of martensitically hardened steel is welded to an inner wall of the nozzle shaft or to the inlet chamber in such a way that a gas-filled pocket forming the volume compensation element is formed between the inner wall and the sheet or strip of martensitically hardened steel. In the case of such a design, expanding fluid acts on the wall region composed of martensitically hardened steel as it freezes, the steel, for its part, acting on the gas enclosed behind said wall. The gas-filled pocket is thus compressed.

This embodiment has the advantage that the volume compensation element can be arranged selectively where the risk of damage to the injection device from stagnant fluid is particularly high.

According to another embodiment, the at least one volume compensation element has regions composed of a flexible, porous plastic, wherein the pores of the plastic are filled with a gas. In this embodiment, a volume compensation element which can be used in a flexible manner and which can be arranged selectively where damage due to expanding fluid would be expected is likewise made available. Moreover, the use of a flexible, porous plastic has the advantage that the volume compensation element is relatively light and cannot leak as easily, which would result in a loss of compressibility.

In one embodiment, the at least one volume compensation element is designed as an inlay and is arranged in the interior of the injection device in such a way that it is surrounded substantially completely by the fluid.

Here and below, an inlay is understood to mean a separate element which already in itself forms the volume compensation element and is arranged in a chamber of the injection device. The inlay is surrounded substantially completely by the fluid when it is surrounded by fluid over the great majority of its surface. Small surface areas—e.g. 25% or less, preferably 10% or less, in particular 5% or less—can be used to suspend or secure the inlay in the chamber, for example, ensuring that it does not come into contact with the fluid.

This embodiment has the advantage that a large surface of the volume compensation element is available for the action of forces exerted by the fluid.

In an alternative embodiment, the at least one volume compensation element is designed as a lining of a wall of the nozzle shaft and/or of the inlet chamber. In this case, the volume compensation element can be designed, for example, as a wall lining composed of flexible, porous plastic or as a gas-filled pocket having a wall region composed of martensitically hardened steel.

This embodiment has the advantage that it is a relatively simple matter to secure the volume compensation element within the injection device.

In particular, the volume compensation element can be arranged in an inlet chamber (or inlet tube) of the injection device. As an alternative or in addition, it can also be arranged in the nozzle shaft of the injection device.

On the one hand, the installation space is available in these regions and, on the other hand, these are also the regions in which the fluid is stagnant and damage can be expected in the case of freezing.

According to one embodiment, the valve needle is formed from martensitically hardened steel and has a gas-filled cavity within its interior. In this embodiment, the valve needle itself forms the volume compensation element or one of the volume compensation elements. By virtue of its deformable walls and the gas-filled cavity, it is compressible.

This embodiment has the advantage that a relatively large volume compensation element can be made available without the need to create additional installation space within the injection device.

In particular, the injection device is designed as an injection device for a urea solution in an exhaust gas aftertreatment system since, owing to the freezing point of urea solution of −7° C., such injection devices must be protected appropriately against destruction by the expansion in volume of the urea.

According to another aspect of the invention, it is also possible to form parts of the injection device from martensitically hardened steel in order to achieve a particular resistance. For example, a nozzle plate which, in particular, has the valve seat and/or at least one nozzle of the injection device, can be formed from martensitically hardened steel. As an alternative or in addition, the valve body can be formed from martensitically hardened steel—in particular at least in the region of the nozzle shaft. In this and other embodiments, the nozzle shaft is preferably arranged upstream of the nozzle plate and, in particular, can adjoin said nozzle plate. The nozzle shaft and the nozzle plate can be produced integrally—that is to say, in particular, from one and the same workpiece—or manufactured separately. This can be combined with the volume compensation elements described or can be used in isolation to obtain a better strength for the injection device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further advantages and advantageous embodiments and developments of the injection device will become apparent from the following exemplary embodiments described in greater detail with reference to figures.

DETAILED DESCRIPTION OF THE PREFERRED EMBODIMENTS

The following description of the preferred embodiment(s) is merely exemplary in nature and is in no way intended to limit the invention, its application, or uses.

Figure 1:
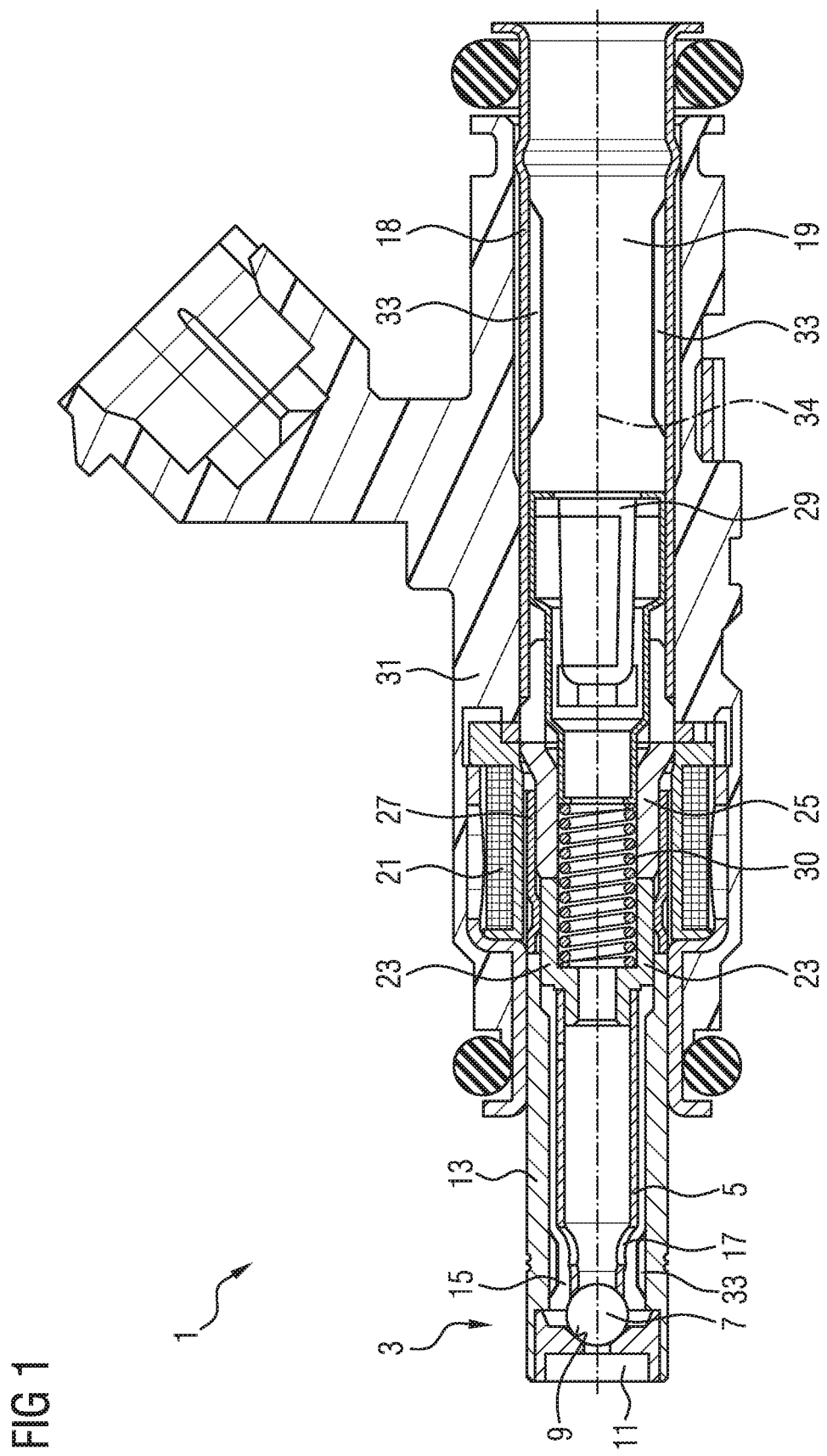
FIG. 1 shows diagrammatically a section through an injection device according to a first exemplary embodiment of an invention.

FIG. 1 shows an injection device 1 in accordance with a first exemplary embodiment of the invention, which is designed as an injection device for a urea solution in a system for exhaust gas aftertreatment in a motor vehicle.

The injection device 1 has a valve 3, which has a valve needle 5, a tip 7 designed as a ball, and a valve seat 9. When closed, the tip 7 is pressed onto the valve seat 9 by the force of a spring 30 and thus closes the nozzle 11. The valve seat 9 and the nozzle 11 are contained in a nozzle plate of the injection device 1, which is designed as an injection valve. A valve housing 13 surrounds the valve 3 and the nozzle shaft 15, which is formed as a cavity within the valve housing 13 and is filled with urea solution during operation. An opening 17 in the valve needle 5, which is of hollow design, allows urea solution to cross into the nozzle shaft 15.

An inlet chamber 19, which is formed by the inlet tube 18 and has a flow connection to the nozzle shaft 15, adjoins the nozzle shaft on the side of the nozzle shaft 15 facing away from the valve. Arranged in the inlet chamber 19 is a filter 29 for the fluid, by means of the positioning of which the preload of the spring 30 can be adjusted.

During operation, the inlet chamber 19 and the nozzle shaft 15 are filled with the fluid to be injected—urea solution in the exemplary embodiment under consideration. In order to allow injection of urea solution through the nozzle 11, the injection device 1 has an electromagnetic actuation device.

The electromagnetic actuation device has a coil 21, an armature 23, a pole piece 25 and a nonmagnetic sleeve 27, which is press-fitted onto one end of the pole piece 25. The armature 23 is movable relative to the valve body 13 in the longitudinal direction of the injection device 1 and takes along the valve needle 5, which opens the nozzle 11 when moved in a direction away from the valve seat 9 and allows urea solution to emerge through the nozzle 11.

The injection device 1 has gas-filled compressible volume compensation elements 33, which allow compensation of a volume increase of the urea solution in the event of freezing and thus prevent damage to the injection device 1. In the first embodiment shown, a first volume compensation element 33 is arranged in the region of the nozzle shaft 15 and a second volume compensation element 33 is arranged in the region of the inlet chamber. In the embodiment shown, both volume compensation elements 33 are designed as wall linings.

Figure 2:
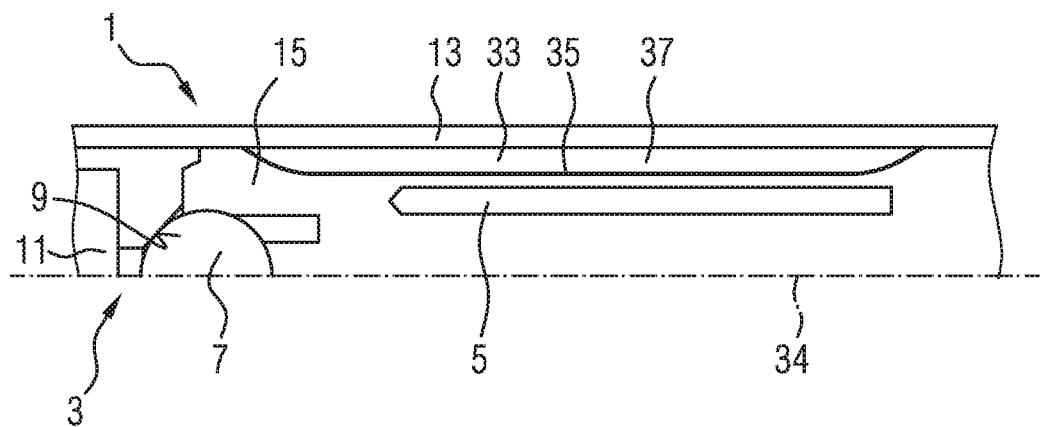
FIG. 2 shows diagrammatically a detail of the injection device shown in FIG. 1.
Figure 3:
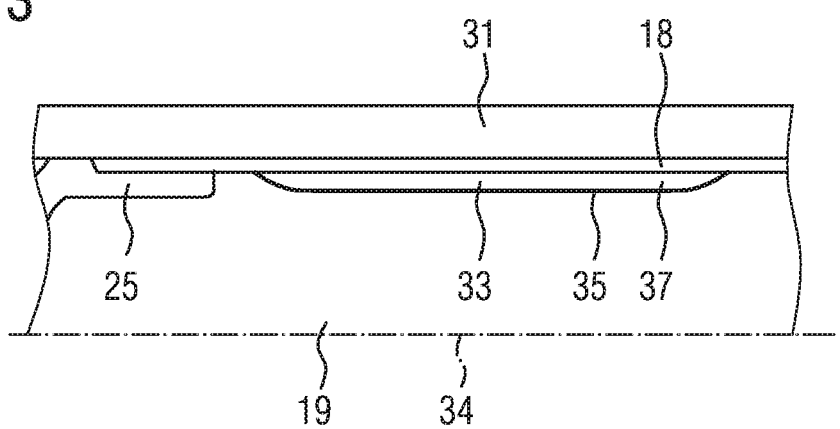
FIG. 3 shows diagrammatically a further detail of the injection device shown in FIG. 1.

The volume compensation elements 33 according to this first embodiment are shown in detail in FIGS. 2 and 3. For the sake of simplicity, FIGS. 2, 3, 5 and 6 show only the half of the injection device 1 above the axis of symmetry 34.

The volume compensation elements 33 each have a wall 35, which is formed by a thin sheet or strip composed of a martensitically hardened steel. The wall 35 is welded to the valve housing 13 or the inlet tube 18 in such a way that a gas-filled cavity 37 is formed between the wall 35 and the valve housing 13 or the inlet tubing 18. In particular, the gas-filled cavity is filled with air. The surface of the nozzle shaft 15 which defines the fluid-filled cavity and which is in contact with the fluid is thus formed by a surface of the volume compensation element 33 welded to the valve housing 13 and, where applicable, by regions of an inner circumferential surface of the valve body 13 which are uncovered by the volume compensation element 33.

If the urea solution freezes and there is an associated increase in volume, the urea solution exerts a force on the wall 35 of the volume compensation elements 33. Owing to this force, the air in the gas-filled cavity 37 is compressed and the wall 35 undergoes deformation during this process. No additional force is exerted on other components of the injection device 1, e.g. on the valve housing 13 or the inlet tube 18, or a force exerted thereon is greatly reduced, by virtue of the fact that the volume compensation elements 33 compensate for the majority of the increase in volume or even the entire increase in volume of the urea solution. Thus, the loading of the injection device 1 due to freezing fluid is greatly reduced and its service life is thus increased.

Figure 4:
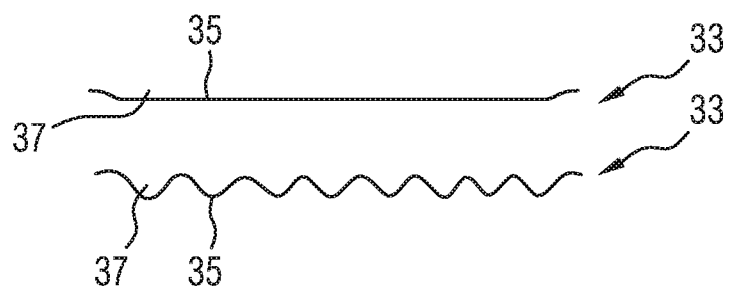
FIG. 4 shows details of embodiments of the volume compensation elements of the injection device shown in FIG. 1.

FIG. 4 shows different embodiments of the volume compensation elements 33 shown in FIGS. 1 to 3. While the wall 35 is largely parallel to the inner wall of the valve housing 13 and of the inlet tube 18 in the upper illustration in FIG. 4, the wall 35 in the lower illustration in FIG. 4 has an undulating shape in section. This enlarges its surface area and increases its deformability.

Figure 5:
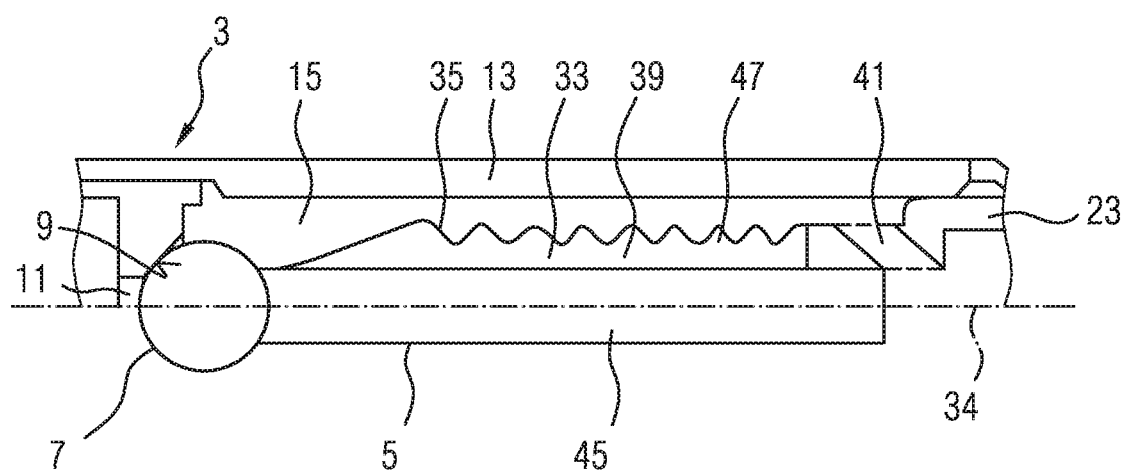
FIG. 5 shows diagrammatically a section through an injection device according to a second exemplary embodiment of the invention.

FIG. 5 shows an injection device 1 for a liquid urea solution according to a second exemplary embodiment of the invention. This differs from that shown in FIGS. 1 to 3 in that the volume compensation element 33 is formed by the valve needle 5 itself. In this embodiment, the valve needle 5 is of closed and internally hollow design. Since it is closed, it is not filled with urea solution during operation. On the contrary, it has a solid main body 45, which can be composed of martensitically hardened steel, for example, and a compressible body 47, which is arranged around the main body and connected thereto and which forms the volume compensation element 33. As already described in connection with other embodiments, the compressible body 47 can be formed from porous plastic or can have a wall 35 with a gas-filled cavity 39 behind it.

In the embodiment shown, the martensitically hardened steel has a composition of 8% by weight of nickel, 1% by weight of molybdenum, 13% by weight of chromium, a maximum of 0.5% by weight of beryllium, with the remainder being iron. This material has very good deformability, good spring properties and good corrosion resistance. As has been found, it is very suitable for the formation of volume compensation elements 33 by virtue of these properties.

Since, in this embodiment, the valve needle 5 is sealed and not filled with urea solution, an opening 41 for the urea solution from the inlet chamber 19 into the nozzle shaft 15 is provided above the valve needle 5, in the region of the armature 23.

Figure 6:
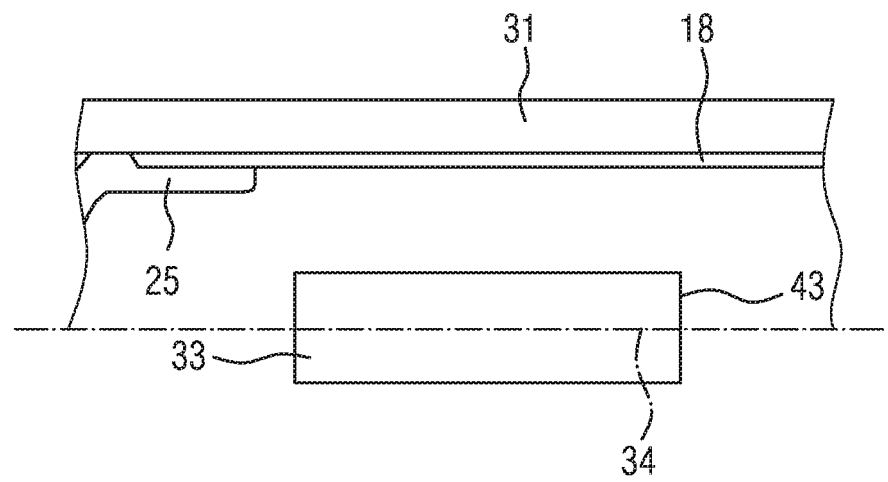
FIG. 6 shows diagrammatically a section through an injection device according to a third exemplary embodiment of the invention.

FIG. 6 shows an injection device 1 according to a third embodiment of the invention. This differs from the other embodiments in that the volume compensation element 33 is formed by an inlay 43 arranged within the inlet chamber 19. The inlay 43 is designed as a compressible body, e.g. as a plastic body composed of a flexible plastic with gas-filled pores therein or as a body with a metal wall, which surrounds a gas-filled cavity. Steel can be used as a material for the metal wall, for example. In addition to maraging steels, stainless steels are also suitable.

The inlay 43 is substantially surrounded by urea solution since it is arranged centrally in the inlet chamber 19. In the embodiment shown in FIG. 6, it is arranged along the axis of symmetry 34 of the injection device 1. The inlay 43 is fixed in the inlet chamber 19 in this position, in which it offers a large surface to the fluid. The fastening, which is not shown in FIG. 6, can be accomplished by clipping, for example, that is to say, in particular, by fastening by means of a spring clip.

If the urea solution freezes, forces act on the inlay 43 from all sides and compress it so as to compensate the increase in volume of the urea solution, thus preventing damage to the injection device 1.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An injection device for metering a fluid, comprising:
   a valve, which has a valve needle and a valve seat;
   a nozzle shaft, which surrounds the valve needle and which holds a volume of the fluid;
   an inlet tube;
   an inlet chamber formed by the inlet tube, which adjoins the nozzle shaft on the side of the nozzle shaft facing away from the valve and which has a flow connection to the nozzle shaft;
   at least one compressible volume compensation element, which is filled with a gas, the at least one compressible volume compensation element located in the inlet chamber and is a wall lining of the inlet tube; and
   a wall region, the wall region being part of the at least one compressible volume compensation element, the wall region being composed of a martensitically hardened steel;

wherein the at least one compressible volume compensation element is in contact with the fluid.

2. The injection device of claim 1, the at least one volume compensation element further comprising regions composed of a flexible, porous plastic, wherein the pores of the plastic are filled with the gas.

3. The injection device of claim 1, the at least one volume compensation element further comprising an inlay, wherein the inlay is arranged in the interior of the injection device in such a way that the inlay is surrounded substantially completely by the fluid.

4. The injection device of claim 1, another volume compensation element comprising a lining of a wall of the nozzle shaft.

5. The injection device as claimed in claim 1, the valve needle further comprising:
   a gas-filled cavity within the interior of the valve needle;
   wherein the valve needle is formed from martensitically hardened steel.

6. The injection device of claim 1, wherein the injection device is used for a urea solution in an exhaust gas aftertreatment system.

7. The injection device of claim 6, wherein the injection device is used as part of a motor vehicle.

* * * * *